(12) United States Patent
Yokoyama

(10) Patent No.: US 11,167,780 B2
(45) Date of Patent: Nov. 9, 2021

(54) MOBILE BODY AND TERMINAL CASE TO BE ATTACHED TO THE SAME

(71) Applicant: TOSHIBA TEC KABUSHIKI KAISHA, Tokyo (JP)

(72) Inventor: Yukiko Yokoyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 285 days.

(21) Appl. No.: 16/441,409

(22) Filed: Jun. 14, 2019

(65) Prior Publication Data

US 2020/0139997 A1    May 7, 2020

(30) Foreign Application Priority Data

Nov. 1, 2018  (JP) .............................. JP2018-206869

(51) Int. Cl.
*B62B 3/14* (2006.01)
*B62B 5/00* (2006.01)
*G06F 1/16* (2006.01)
*G06K 7/10* (2006.01)

(52) U.S. Cl.
CPC .............. *B62B 3/1424* (2013.01); *B62B 3/14* (2013.01); *B62B 3/1412* (2013.01); *B62B 3/1428* (2013.01); *B62B 5/0096* (2013.01); *G06F 1/1626* (2013.01); *G06K 7/10* (2013.01); *G06K 2007/10524* (2013.01)

(58) Field of Classification Search
CPC ....... B62B 3/1424; B62B 3/14; B62B 3/1412; B62B 3/1428; B62B 5/0096; G06F 1/1626; G06K 7/10; G06K 2007/10524; G06K 7/10881; G07G 1/0081; G07F 7/0618; G06Q 20/3276

See application file for complete search history.

(56) References Cited

U.S. PATENT DOCUMENTS

| 4,071,740 A * | 1/1978 | Gogulski | G07G 1/06 |
| | | | 235/431 |
| 4,766,297 A * | 8/1988 | McMillan | G06K 7/10861 |
| | | | 235/455 |
| 5,105,070 A * | 4/1992 | Wike, Jr. | G06K 7/10871 |
| | | | 235/462.45 |

(Continued)

FOREIGN PATENT DOCUMENTS

| CN | 110999015 A * | 4/2020 | .............. H02J 50/10 |
| EP | 0490605 A1 * | 6/1992 | ......... G06K 7/10881 |

(Continued)

OTHER PUBLICATIONS

Extended European Search Report dated Jan. 15, 2020, filed in counterpart European Patent Application No. 19192243.4, 9 pages.

(Continued)

*Primary Examiner* — Jacob B Meyer
(74) *Attorney, Agent, or Firm* — Kim & Stewart LLP

(57) ABSTRACT

According to an embodiment, a mobile body acquires product information given to a product to be purchased and transports the product to be purchased. The mobile body includes a cart body, an acquisition device, and a holder. The cart body is moved to transport the product. The acquisition device acquires the product information. The holder detachably holds the acquisition device.

10 Claims, 7 Drawing Sheets

(56) References Cited

U.S. PATENT DOCUMENTS

| | | | | |
|---|---|---|---|---|
| 5,132,523 A | * | 7/1992 | Bassett | G06K 7/10871 |
| | | | | 235/455 |
| 5,250,789 A | * | 10/1993 | Johnsen | B62B 3/142 |
| | | | | 705/14.23 |
| 5,314,631 A | * | 5/1994 | Katoh | G06K 7/10871 |
| | | | | 235/462.4 |
| 5,340,973 A | * | 8/1994 | Knowles | G02B 26/106 |
| | | | | 235/462.22 |
| 5,446,272 A | * | 8/1995 | Barkan | G06K 7/10564 |
| | | | | 235/454 |
| 5,734,839 A | | 3/1998 | Enoki et al. | |
| 6,860,427 B1 | * | 3/2005 | Schmidt | G06K 7/10871 |
| | | | | 235/462.32 |
| 7,443,295 B2 | | 10/2008 | Brice et al. | |
| 7,660,747 B2 | | 2/2010 | Brice et al. | |
| 9,230,249 B1 | * | 1/2016 | Vora | G07G 3/00 |
| 9,367,723 B1 | * | 6/2016 | Drzymala | H02J 7/00 |
| 2005/0035198 A1 | * | 2/2005 | Wilensky | B62B 3/1424 |
| | | | | 235/383 |
| 2005/0082371 A1 | * | 4/2005 | Schmidt | G06K 7/10871 |
| | | | | 235/462.45 |
| 2006/0256400 A1 | * | 11/2006 | Carnevali | G06K 7/109 |
| | | | | 358/473 |
| 2006/0289637 A1 | | 12/2006 | Brice et al. | |
| 2010/0308116 A1 | * | 12/2010 | Sani | G06K 7/10881 |
| | | | | 235/472.01 |
| 2011/0057083 A1 | * | 3/2011 | Carnevali | F16M 13/02 |
| | | | | 248/274.1 |
| 2016/0034055 A1 | * | 2/2016 | Utykanski | G06K 7/10891 |
| | | | | 235/462.13 |
| 2016/0300455 A1 | * | 10/2016 | Hutchings | B62B 3/1424 |
| 2018/0069583 A1 | * | 3/2018 | Brownlow | H04B 1/385 |
| 2018/0330135 A1 | * | 11/2018 | Suman | G06K 19/14 |
| 2019/0073656 A1 | * | 3/2019 | Joseph | G06Q 20/40145 |
| 2019/0318140 A1 | * | 10/2019 | Drzymala | G06K 7/10831 |
| 2020/0108851 A1 | * | 4/2020 | Hagen | B62B 3/1464 |
| 2020/0139997 A1 | * | 5/2020 | Yokoyama | G06Q 20/18 |
| 2020/0172140 A1 | * | 6/2020 | Yokoyama | B62B 5/0053 |
| 2020/0198680 A1 | * | 6/2020 | Hagen | B62B 5/0096 |
| 2021/0001741 A1 | * | 1/2021 | Miyoshi | B60L 53/38 |
| 2021/0090052 A1 | * | 3/2021 | Maita | B62B 3/1424 |
| 2021/0174040 A1 | * | 6/2021 | Mazzone | G06K 7/1413 |

FOREIGN PATENT DOCUMENTS

| | | | | |
|---|---|---|---|---|
| EP | 3648071 A1 | * | 5/2020 | B62B 3/14 |
| GB | 2429318 A | * | 2/2007 | A47F 10/02 |
| JP | H08287177 A | * | 11/1996 | |
| JP | H1139423 A | * | 2/1999 | |
| JP | 2009169585 A | * | 7/2009 | |
| WO | 98/55954 A1 | | 12/1998 | |
| WO | WO-03088168 A2 | * | 10/2003 | G08B 13/2462 |
| WO | WO-2004017831 A1 | * | 3/2004 | A61B 5/0013 |
| WO | WO-2016171338 A1 | * | 10/2016 | G06K 7/14 |

OTHER PUBLICATIONS

European Office Action dated Aug. 3, 2021, mailed in corresponding European Patent Application No. 19192243.4, 10 pages.

* cited by examiner

MOBILE BODY AND TERMINAL CASE TO BE ATTACHED TO THE SAME

CROSS-REFERENCE TO RELATED APPLICATION

This application is based upon and claims the benefit of priority from the prior Japanese Patent Application No. 2018-206869, filed on Nov. 1, 2018, the entire contents of which are incorporated herein by reference.

FIELD

An embodiment to be described here generally relates to a mobile body and a terminal case to be attached to the mobile body.

BACKGROUND

In many supermarkets, shopping malls, and the like, shopping carts are prepared in stores, as mobile bodies for carrying products that customers desire to purchase. In recent years, a scanner is provided on the handle or frame of the shopping cart as a device for acquiring product information. Then, there has been proposed a sale form in which a shopper uses the scanner to read the product code of a product to be purchased by himself/herself. Further, in order to improve the usability of the shopper, it has also been proposed to replace the scanner to be provided on the shopping cart with a hand scanner that can be held by the shopper by hand. In this type of shopping cart, the above-mentioned hand scanner is held in a scanner holder provided on the shopping cart when the shopper does not use the hand scanner. The hand scanner held in the scanner holder needs to be firmly held by the shopping cart because it receives vibration when the shopping cart travels or impact when stacking the shopping cart.

DETAILED DESCRIPTION

Figure 1:
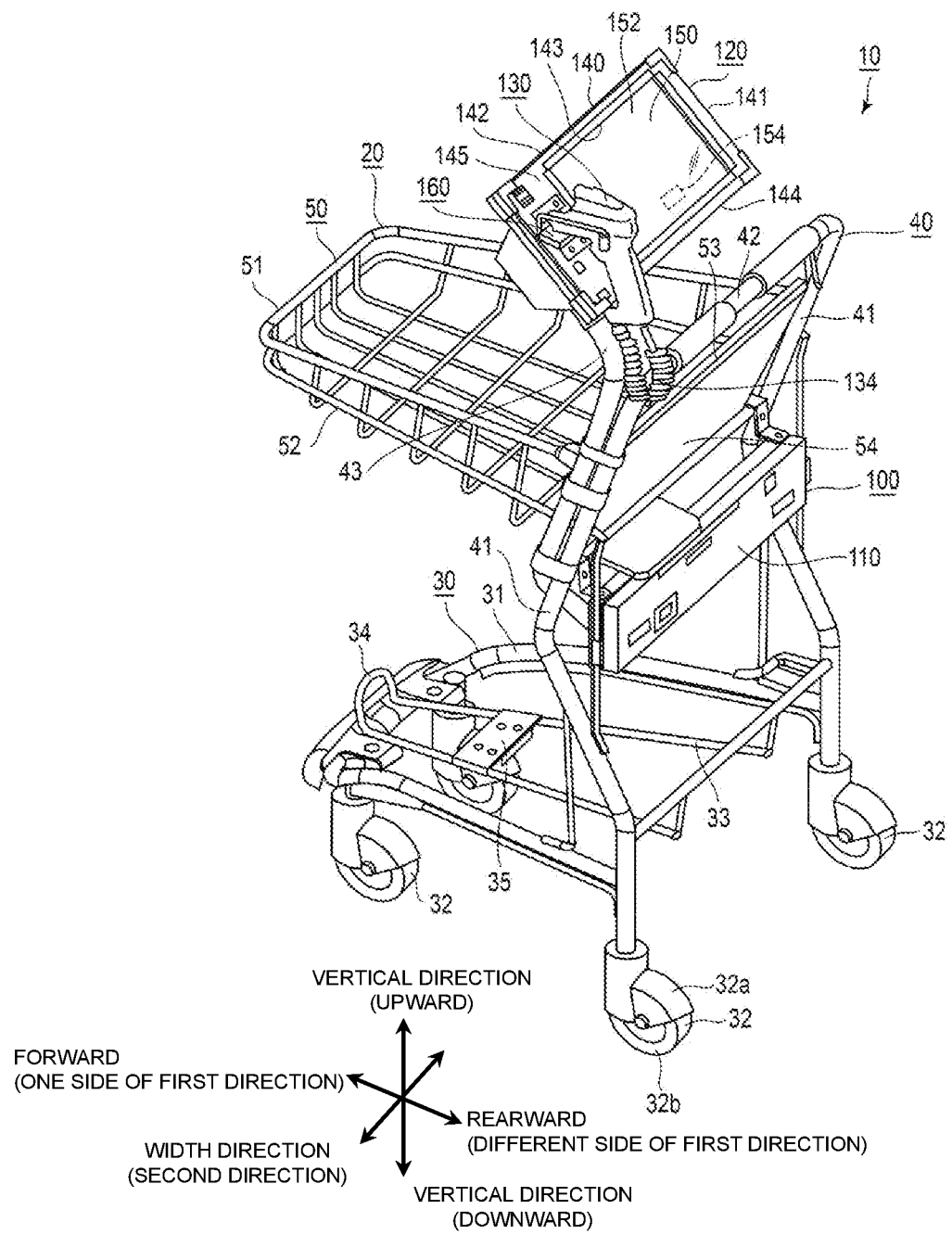
FIG. 1 is an external perspective view showing a shopping cart according to an embodiment.

According to an embodiment, a mobile body acquires product information given to a product to be purchased and transports the product to be purchased. The mobile body includes a cart body, an acquisition device, and a holder. The cart body is moved to transport the product. The acquisition device acquires the product information. The holder detachably holds the acquisition device. The acquisition device includes a head and a handle. The head includes an information acquisition unit provided on one side of a first direction, the information acquisition unit being to be directed to the product to acquire the product information. Further, the head has a first predetermined width in a second direction orthogonal to the first direction, the first predetermined width on a different side of the first direction being narrower than the first predetermined width on the one side. The handle is provided on a lower part on the different side of the head. The handle has a second predetermined width in the second direction, the second predetermined width being narrower than the first predetermined width on the different side of the head. The holder is attached to the cart body. The holder includes a pair of head regulators, a head support, and a stopper. The pair of head regulators are provided to have a space that is narrower than a maximum width of the first predetermined width of the head and wider than a maximum width of the second predetermined width of the handle, the pair of head regulators being adapted to be in contact with a side surface on the different side of the head held in the space. The head support is adapted to be in contact with a lower surface of the head held in the space of the pair of head regulators. The stopper is adapted to be in contact with the handle while the head is held in the space of the pair of head regulators.

Hereinafter, with reference to the drawings, an embodiment will be described. In the drawings, the same reference symbols indicate the same or similar portions. As an example of a mobile body according to the embodiment, a shopping cart to be used in a retail store such as a supermarket is taken as an example. An external configuration of a shopping cart 10 will be described with reference to FIG. 1. A configuration of a hand scanner 130 attached to the shopping cart 10 as viewed from the oblique direction will be described with reference to FIG. 2. A state where an open/close lid 142 of a tablet case (terminal case) 140 attached to the shopping cart is opened will be described with reference to FIG. 3. A configuration of the hand scanner 130 attached to the shopping cart 10 as viewed from the front direction will be described with reference to FIG. 4. The configuration of the hand scanner 130 attached to the shopping cart 10 as viewed from the side direction will be described with reference to FIG. 5. The configuration of the hand scanner 130 attached to the shopping cart 10 as viewed from above will be described with reference to FIG. 6. A stacking state of the shopping cart 10 as viewed from the side direction will be described with reference to FIG. 7.

Note that the shopping cart 10 functions as a registration device that reads the product code of a product that a shopper desires to purchase. A list of read products is transferred to a separate device, i.e., a payment device (not shown). Assumption is made that the shopper uses the payment device to which the list of products has been transferred to make payment.

As shown in FIG. 1, the shopping cart 10 according to this embodiment includes a cart body 20 and an electrical device 100. The electrical device 100 is attached to the cart body 20. The cart body 20 transports a shopping basket for housing products. The cart body 20 includes a caster part 30, a frame part 40, and a basket reception part 50. The caster part 30 causes the cart body 20 to smoothly move on the floor surface. The frame part 40 is erected on the rear wheel side of the caster part 30. The basket reception part 50 is attached at the intermediate position in the height direction (vertical direction) of the frame part 40 to protrude toward the forward direction of the shopping cart 10. The caster part 30 and the basket reception part 50 are configured to be capable of appropriately carrying a shopping basket thereon. Note that in this embodiment, the direction in which the basket reception part 50 projects from the frame part 40 (forward direction of the shopping cart 10) is referred to simply as forward or one side of the first direction in some cases as shown in the drawings. Further, in this embodiment, the side of the frame part 40 (rearward direction of the shopping cart 10) is referred to simply as rearward or different side of the first direction in some cases as shown in the drawings. Further, the extending direction of a handle bar 42 described below is referred to simply as width direction or second direction in some cases as shown in the drawings. The above-mentioned first direction and the second direction are, for example, directions orthogonal to each other. Further, the height direction of the shopping cart 10 orthogonal to the horizontal surface including the forward, the rearward, and the width direction of the shopping cart 10 will be referred to simply as vertical direction in some cases as shown in the drawings.

The caster part 30 will be described in more detail. The caster part 30 includes a square frame-shaped frame 31 having a rear side opened, and casters 32 provided at four corners of the frame 31. The casters 32 each include a bracket 32a and a wheel 32b. The bracket 32a freely rotates around an axis in the vertical direction (height direction of the shopping cart 10). The wheel 32b freely rotates around the horizontal axis of the bracket 32a. The wheel 32b is formed of rubber or a resin. Note that a reception part 33 is provided on the frame 31. The reception part 33 is formed in the dimension in which the lower part of the shopping basket is housed. That is, the reception part 33 is configured to be capable of appropriately carrying another shopping basket different from the basket reception part 50 thereon.

The reception part 33 includes a contact part 34 and a regulation plate 35. The contact part 34 is formed at the front end of the reception part 33. When the shopping basket is placed on the reception part 33, the contact part 34 is in contact with the shopping basket to support the shopping basket. The regulation plate 35 is provided rearward of the contact part 34 in the reception part 33. When a plurality of shopping carts 10 is stacked, the regulation plate 35 is in contact with the contact part 34 of the rearward shopping cart 10 to regulate the distance between the shopping carts 10. When the plurality of shopping carts 10 is stacked, the contact part 34 is in contact with the regulation plate 35 formed on the frame 31 of the forward shopping cart 10 to regulate the distance between the shopping carts 10. That is, when plurality of shopping carts 10 is stacked, the regulation plate 35 has a function of regulating the distance with the rearward shopping cart 10, and the contact part 34 has a function of regulating the distance with the forward shopping cart 10. As described above, by regulating the distance between the shopping carts 10, it is possible to prevent, when stacking the shopping carts 10, the hand scanners 130, the tablet cases 140, scanner holders 160, and the like of the forward and rearward shopping carts 10 from being interfered with each other.

Figure 7:
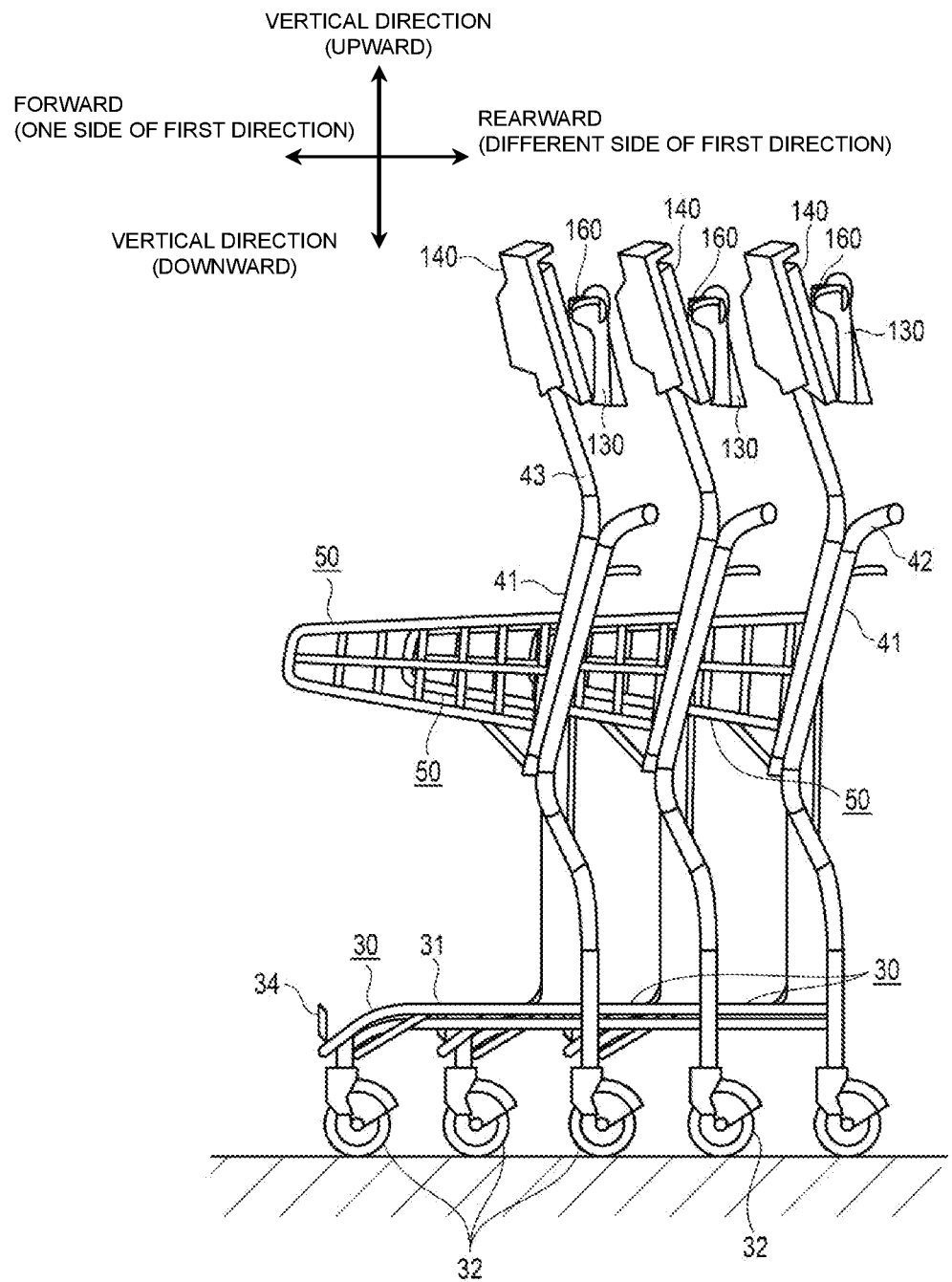
FIG. 7 is a side view showing a stacking state of the shopping cart according to the embodiment.
Figure 2:
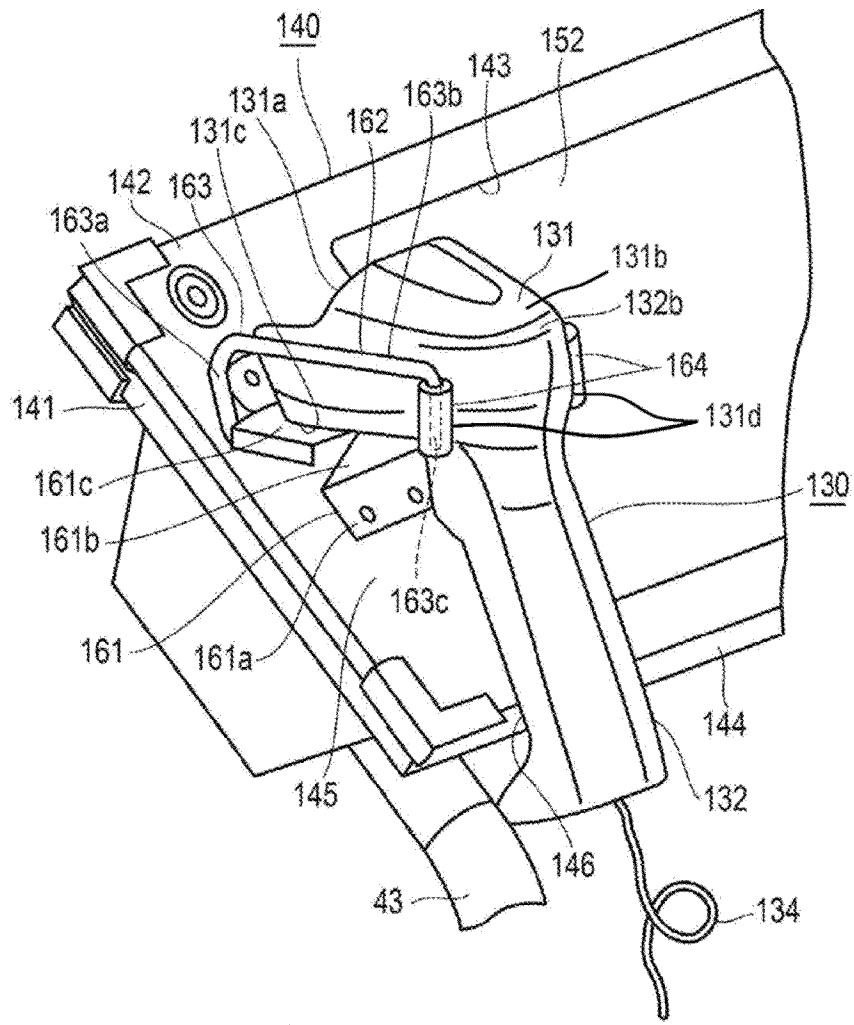
Figure 2:
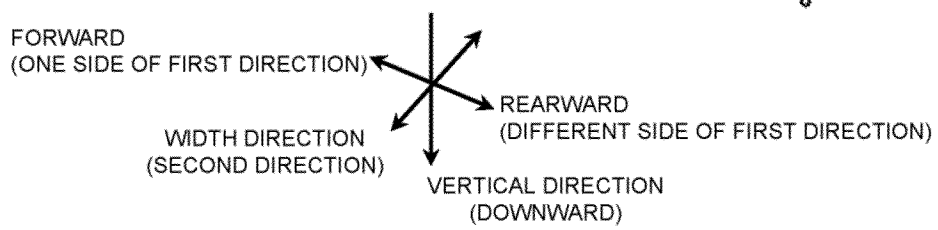

Note that the stacking means arranging the plurality of shopping carts 10 in a line along the front-rear direction. Then, as shown in FIG. 7, it represents pushing the front end side of the shopping cart 10 located on the rear side into the rear side of the shopping cart 10 located on the front side, i.e., the side of the frame part 40 for housing. The shopping cart 10 includes a flap plate 54 (described below) provided on the rear side. The flap plate 54 has a structure in which the front end side of the shopping cart 10 located on the rear side is pushed as described above and thus, the flap plate 54 is opened by being pushed up toward a reception unit 52 (described below). Therefore, even in the case where the plurality of shopping carts 10 are arranged, it is possible to shorten the total length along the front-rear direction and improve the efficiency of housing the shopping cart 10.

As shown in FIG. 1, the frame part 40 includes a pair of vertical frames 41 and 41, and the handle bar 42. The vertical frames 41 and 41 are attached on the side of the right and left rear wheels of the caster part 30. The handle bar 42 extends in the width direction, and connects the upper ends (upper end parts in the vertical direction) of the vertical frames 41 and 41. An extension arm 43 is attached to the vertical frame 41 on the left side in FIG. 1.

As shown in FIG. 1, the basket reception part 50 includes a square frame-shaped frame 51 and the reception unit 52 provided on the lower side of the frame 51. The reception unit 52 is formed in the dimension in which the lower part of the shopping basket is housed. The frame 51 includes a horizontal frame 53 on the rear side. The flap plate 54 is attached to the horizontal frame 53 so as to freely swing around the horizontal frame 53.

The electrical device 100 includes a battery 110 and a product registration device 120. The battery 110 is disposed below the rear end of the basket reception part 50. Specifically, the battery 110 is attached across the vertical frames 41 and 41 in the middle part of the frame part 40. The product registration device 120 is attached to the upper end (upper end portion in the vertical direction) of the extension arm 43. The battery 110 supplies power to the product registration device 120 via a power line inserted into the extension arm 43. In this way, the shopping cart 10 operates as a registration device that reads the product code of a product that a shopper desires to purchase and moves by being pushed by the shopper.

The product registration device 120 includes the hand scanner (acquisition device) 130 that reads a product code and the tablet case 140. A tablet terminal 150 is provided inside the tablet case 140. On the surface of the tablet case 140, the scanner holder (holding part) 160 that detachably holds the hand scanner 130 is provided.

Figure 2:
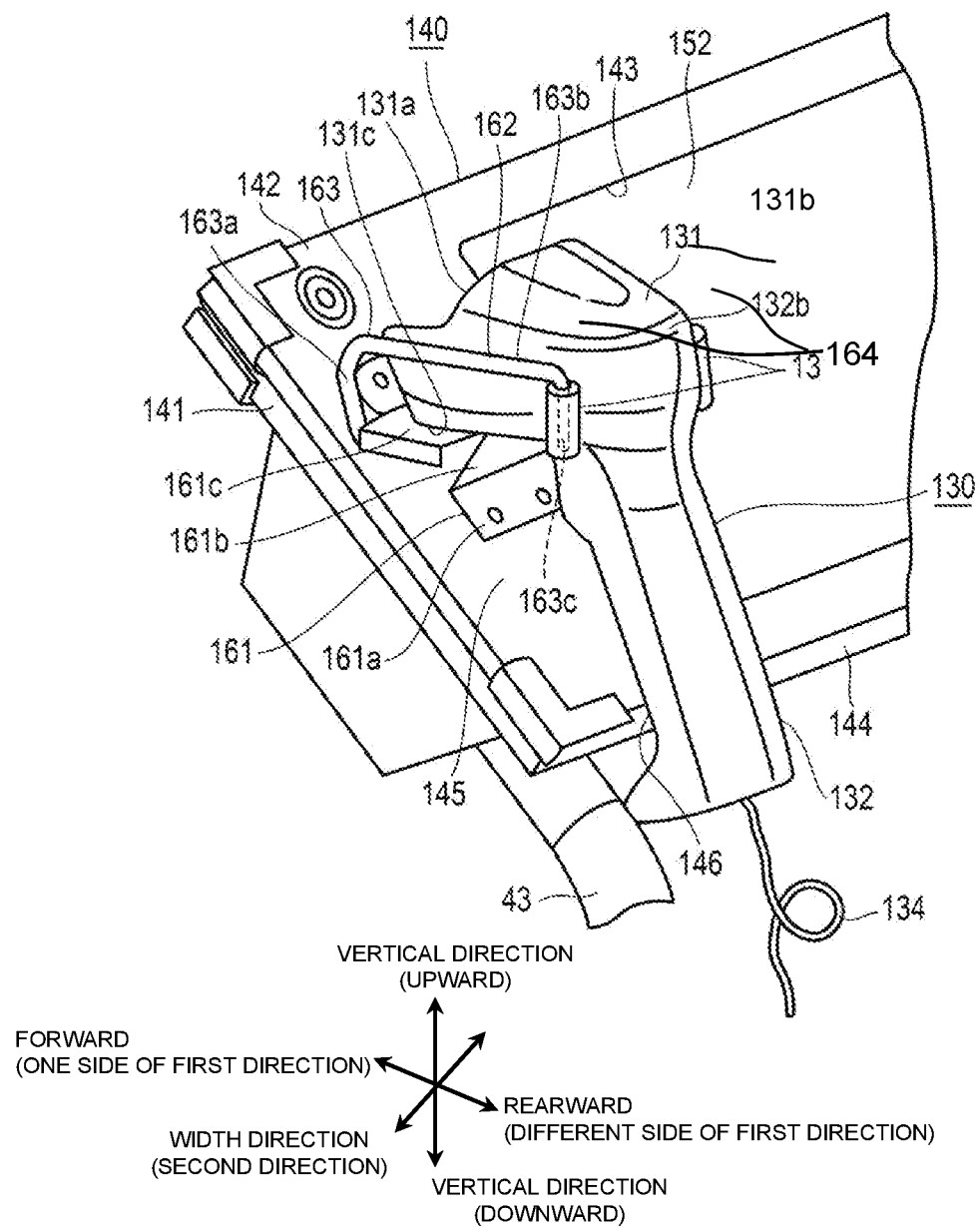
FIG. 2 is a perspective view showing a scanner attached to the shopping cart according to the embodiment.
Figure 4:
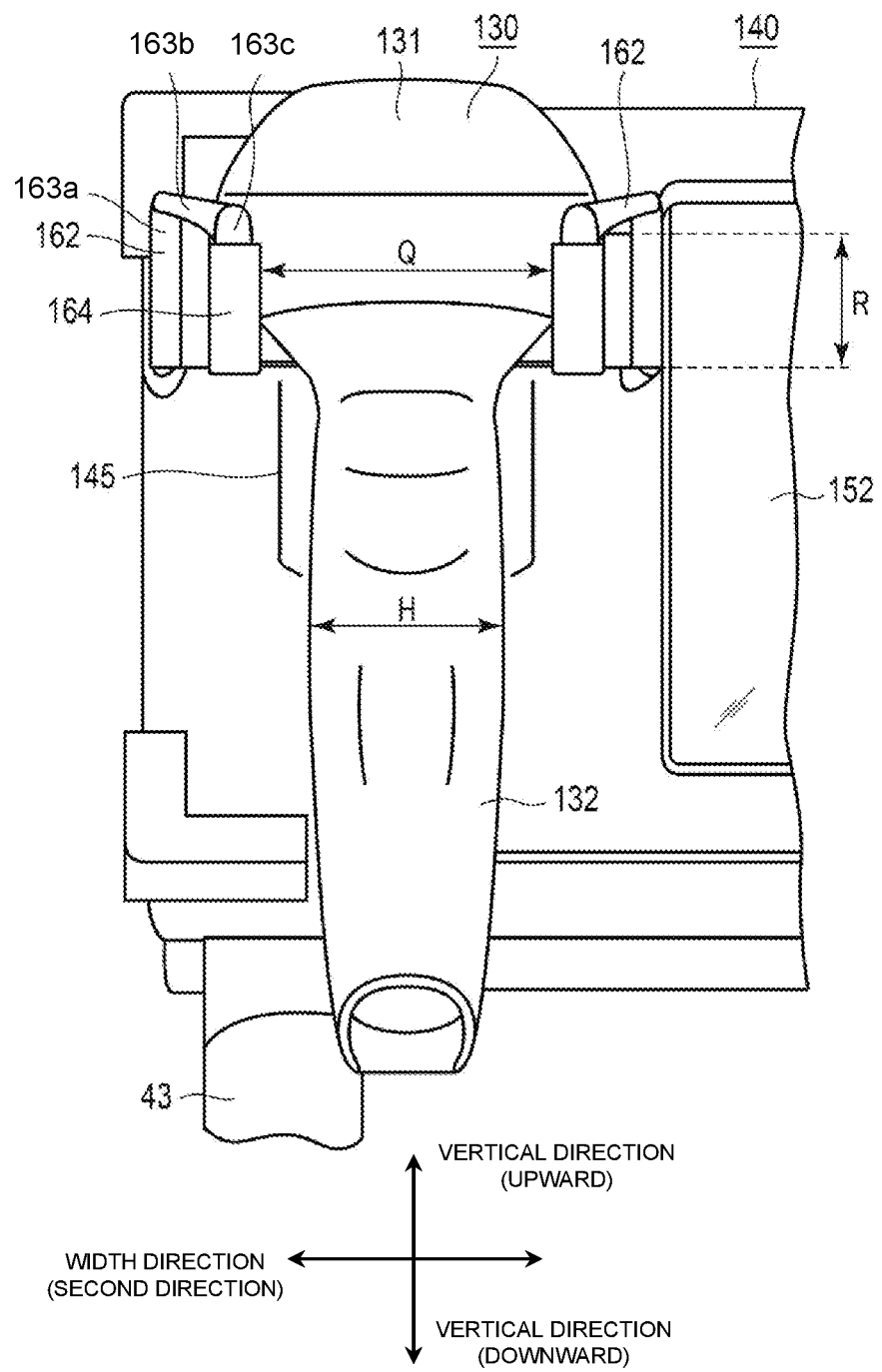
FIG. 4 is a front view of the scanner attached to the shopping cart according to the embodiment.
Figure 5:
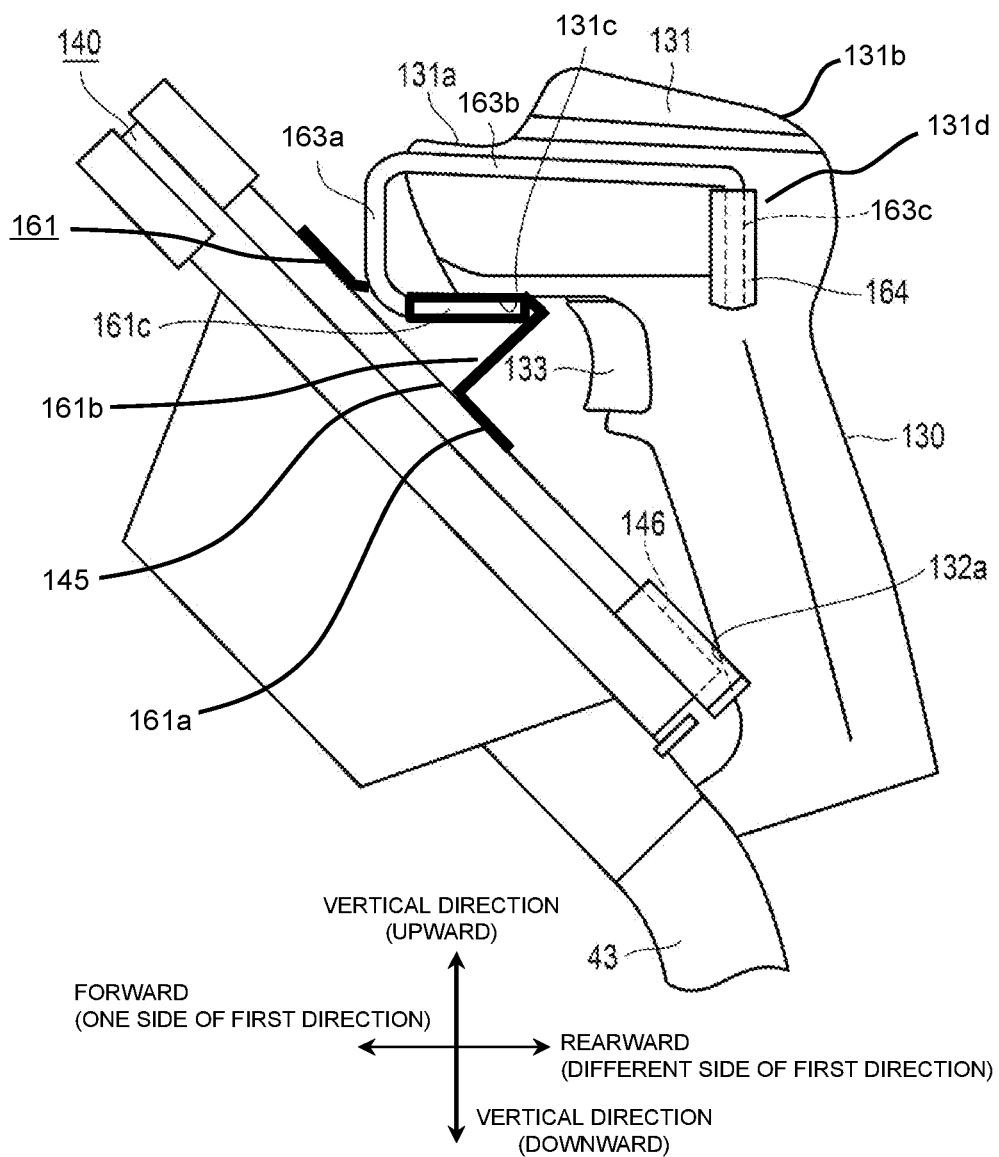
FIG. 5 is a side view showing the scanner attached to the shopping cart according to the embodiment.
Figure 6:
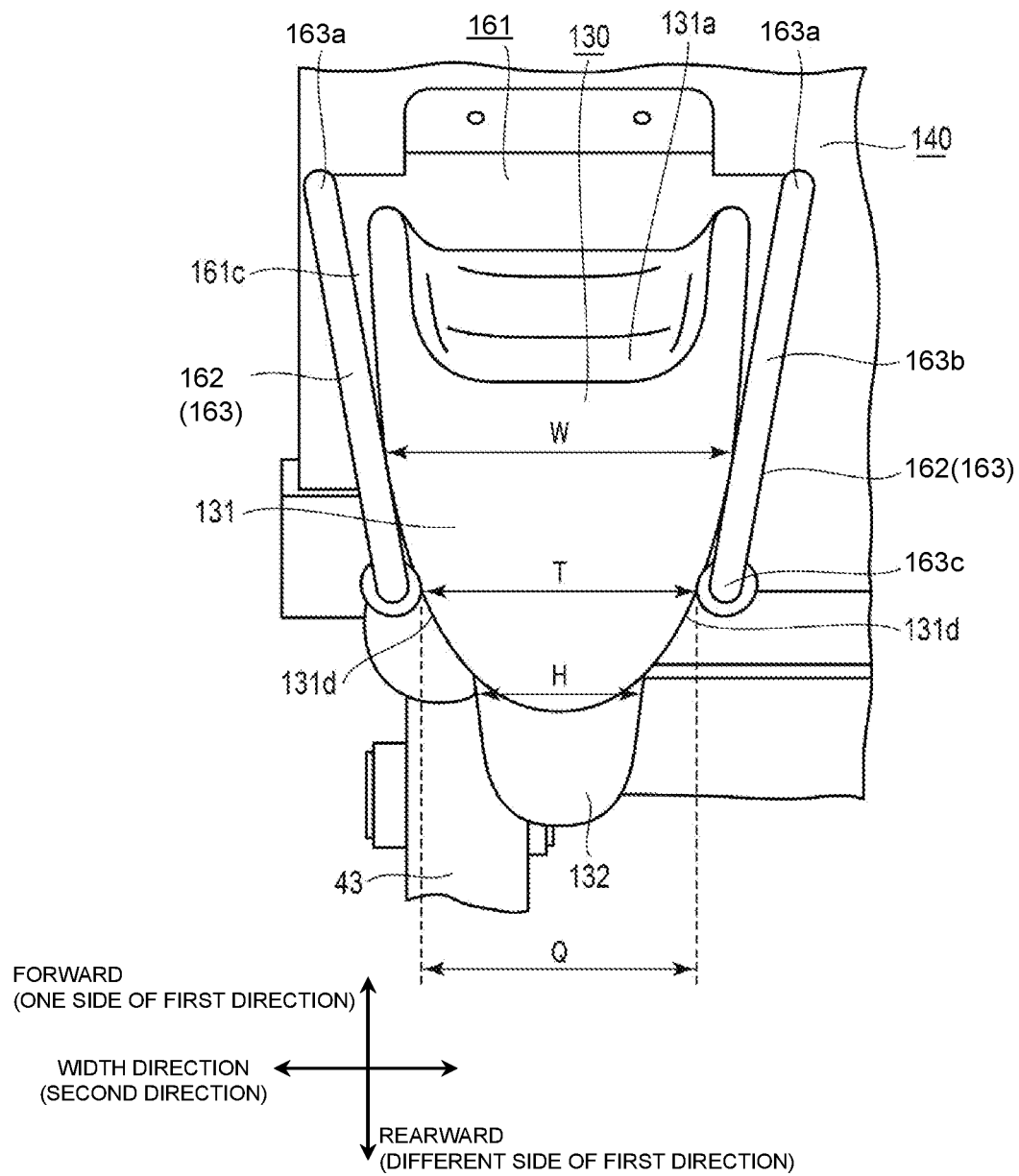
FIG. 6 is a plan view of the scanner attached to the shopping cart according to the embodiment.

As shown in FIG. 2, the hand scanner 130 includes a head 131 and a handle 132 integrally provided to the lower part on the rear side of the head 131. As shown in FIG. 6, the head 131 includes an information acquisition unit 131a that is provided on one side (on the front side) of a first direction and is to be directed to a product in order to acquire product information of the product. The head 131 has a predetermined width (hereinafter, referred to as first predetermined width) in a second direction orthogonal to the above-mentioned first direction, and is formed to have the first predetermined width on the rear side (on the different side of the first direction) narrower than the first predetermined width on the front side (on the one side of the first direction). More specifically, the head 131 is narrowed in the lateral direction (width direction) generally from the front side to the rear side as viewed from above in the vertical direction. Further, as shown in FIG. 4, the head 131 has such a shape that a central portion is wider in the width direction and an upper part (part on the upper side) and a lower part (part on the lower side) in the height direction (vertical direction) are narrower as viewed from the front (rear side of the first direction). Further, as shown in FIG. 2 or FIG. 5, the head 131 includes the information acquisition unit 131a that is provided on the front side (on the one side of the first direction) and acquires the product code (product information) of a product. The information acquisition unit 131a is directed to the product to acquire the product code of the product. For example, as shown in FIG. 2 or FIG. 5, the head 131 includes a flat placement part 131c on the lower side on the front side. For example, as shown in FIG. 6, the head 131 includes contact parts 131*d* on both side surfaces on the rear side. Note that assumption is made that the maximum dimension in the width direction of the head 131 is W (see FIG. 6). Further, assumption is made that the dimension in the width direction of the head 131 between the contact parts 131*d* is T (see FIG. 6).

As shown in FIG. 5, the handle 132 is provided on the lower part on the rear side (the different side of the first direction) of the head 131, and has a predetermined width (second predetermined width) in the second direction. The handle 132 is formed to have the second predetermined width narrower than the first predetermined width on the rear side (on the different side of the first direction) of the head 131. Further, the handle 132 includes a scanner trigger 133. The scanner trigger 133 is provided on the front side (on the front side of the first direction) of the handle 132. The scanner trigger 133 is operated to start the scanner operation (operation of acquiring product information) by the information acquisition unit 131*a*. Note that assumption is made that the maximum dimension of the handle 132 in the lateral direction (width direction) is H (see FIG. 4).

Figure 3:
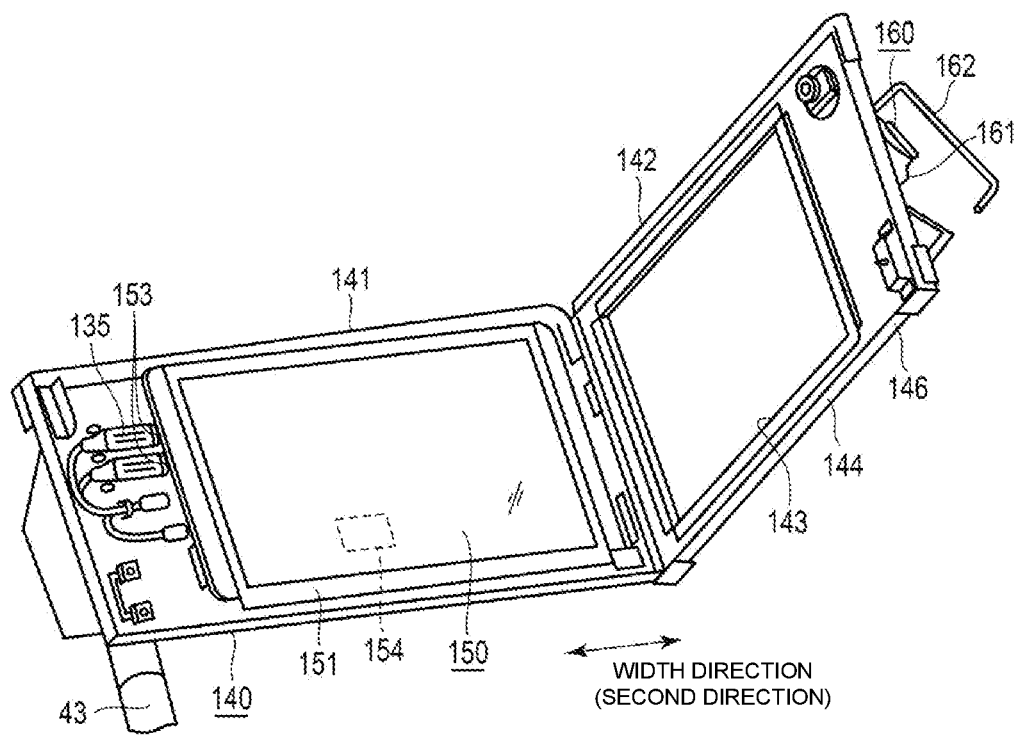
FIG. 3 is a perspective view showing a state where an open/close lid of a table case attached to the shopping cart according to the embodiment is opened.

The hand scanner 130 is connected to the tablet terminal 150 via, for example a curl cord 134 shown in FIG. 2 and a built-in cable 135 shown in FIG. 3. One end of the curl cord 134 is connected to the information acquisition unit 131*a* of the head 131, and the other end thereof is connected to the built-in cable 135. The built-in cable 135 is housed in the tablet case 140 described below. The length of the curl cord 134 is set such that the hand scanner 130 does not reach the floor surface even in the case where the hand scanner 130 hangs on the shopping cart 10 by its own weight when the shopper drops the hand scanner 130. Further, the curl cord 134 can be extended by the shopper as necessary. For example, the length of the curl cord 134 is set such that the curl cord 134 reaches near the bottom surface of the shopping basket placed on the reception part 33 of the caster part 30 farthest from the scanner holder 160.

The hand scanner 130 reads the product code attached to a product taken out of a display shelf by the shopper. The product code is a unique code set for each product for individually identifying the product.

The tablet case 140 is formed in a thin box shape. As shown in FIG. 3, the tablet case 140 includes a case body 141 and the open/close lid 142. The case body 141 is fixed to the extension arm 43. The open/close lid 142 is openably/closably attached to the case body 141. The open/close lid 142 includes an opening part 143. As shown in FIG. 5, a front part 132*a* of the handle 132 of the hand scanner 130 is in contact with a lower end edge 144 of the tablet case 140. For example, as shown in FIG. 2 or FIG. 4, an attachment part 145 is formed on the front surface of the tablet case 140. For example, as shown in FIG. 2 or FIG. 5, in the tablet case 140, a stopper (handle contact part) 146 is formed at the lower end edge 144 of the case body 141. The stopper 146 is in contact with the handle 132 of the hand scanner 130 while the hand scanner 130 is held by the scanner holder 160 to regulate the forward movement of the handle 132.

As shown in FIG. 3, the tablet terminal 150 includes a terminal casing 151. The terminal casing 151 is disposed close to the right side in the width direction of the case body 141 in FIG. 3. The terminal casing 151 includes a display panel 152. The display panel 152 displays various types of information such as the product name and the unit price of the product read by the hand scanner 130. The display panel 152 is disposed to face the opening part 143 of the tablet case 140. The display panel 152 is exposed to the outside through the opening part 143 of the tablet case 140. In FIG. 3, a terminal part 153 is provided on the left side surface in the width direction of the terminal casing 151. A controller 154 is provided inside the terminal casing 151. The controller 154 collectively controls the battery 110, the hand scanner 130, and the tablet terminal 150. The controller 154 acquires product information on the basis of the product code read by the hand scanner 130.

As shown in FIG. 2, the scanner holder 160 is provided on the terminal casing 151 of the tablet terminal 150. The scanner holder 160 includes a head support 161 and a pair of head regulators 162, and holds the hand scanner 130 in cooperation with the stopper 146 of the tablet case 140. Specifically, the scanner holder 160 that holds the hand scanner 130 includes the stopper 146. The head support 161 is attached to the attachment part 145 of the tablet case 140. The placement part 131*c* of the head 131 is placed on the head support 161. The pair of head regulators 162 are provided to have a space described below. The head regulators 162 are engaged with a rear end side part 131*b* of the head 131 to hold the head 131.

The head support 161 is formed by bending a plate-like member. For example, as shown in FIG. 2 or FIG. 5, the head support 161 includes a retaining part 161*a*, an extending part 161*b*, and a supporting part 161*c*. The retaining part 161*a* is attached to the attachment part 145. The extending part 161*b* extends in a direction away from the attachment part 145 from the upper end (upper end part) in the vertical direction of the retaining part 161*a*. The supporting part 161*c* is folded back to the side of the attachment part 145 from the extending part 161*b*. The supporting part 161*c* is formed to have a horizontal surface or a surface having the rear part slightly higher than the front part. The supporting part 161*c* makes surface contract with the placement part 131*c* of the head 131.

The head regulators 162 are provided to have a space that is narrower than a maximum width W (see FIG. 6) of the first predetermined width of the head 131 and wider than a maximum width H (see FIG. 4 and FIG. 6) of the second predetermined width of the above-mentioned handle. The head regulators 162 are in contact with the side surface (rear end side part 131*b*) on the rear side (on the different side of the first direction) of the above-mentioned head 131 held in the space to regulate the rearward movement. More specifically, for example, as shown in FIG. 2 or FIG. 5, the head regulators 162 includes a pair of arms 163. The pair of arms 163 are attached to the supporting part 161*c* at the base end thereof. The arms 163 each include a base-end arm 163*a*, a horizontal arm 163*b*, and a regulation arm 163*c*. The base-end arm 163*a* is on the side of the base end of the arms 163, and is formed to extend in the upward direction (upward direction of the substantially vertical direction). The lower end (lower end part in the vertical direction) of the base-end arm 163*a* is attached to, for example, the supporting part 161*c* of the head support 161. The horizontal arm 163*b* is formed to extend in the horizontal direction from the upper end of the base-end arm 163*a* (upper end part in the vertical direction in the figure). The regulation arm 163*c* is formed to extend in the downward direction (downward direction of the vertical direction in the figure) from the front end side of the horizontal arm 163*b*. A member that applies a frictional force to the head 131 is attached to the regulation arm 163*c*. More specifically, as the above-mentioned member that applies the frictional force, rubber tubes 164 that are non-slips for the contact parts 131*d* of the head 131 are attached to the regulation arm 163c. The rubber tubes 164 each have a predetermined length R in the vertical direction in the figure (see FIG. 4).

For example, as shown in FIG. 2 and FIG. 6, the pair of horizontal arm 163b are disposed along the shape of the head 131 so that the distance between them is reduced as they away from the attachment part 145 of the tablet case 140. Further, a dimension Q of the distance (distance in the width direction in FIG. 4) between the pair of rubber tubes 164 described above is substantially the same as a width dimension T (see FIG. 6) between the contact parts 131d of the head 131 described above. Further, the dimension Q of the distance between the rubber tubes 164 is set to be narrower than the maximum width W (see FIG. 6) in the width direction of the head 131 and wider than the maximum width H (see FIG. 4 or FIG. 6) in the lateral direction of the handle 132.

Therefore, when the placement part 131c of the head 131 is placed on the supporting part 161c of the scanner holder 160 while the information acquisition unit 131a of the tablet case 140 is directed forward, the contact parts 131d of the head 131 on both sides are in contact with the inside of the pair of rubber tubes 164. Since the dimension of the head 131 in the width direction on the front side is larger than the dimension in the width direction on the rear side, movement from the rubber tubes 164 to the rear side is regulated.

The coefficient of friction and the dimension R of the rubber tubes 164 are set to such values that the shopper is capable of easily taking the hand scanner 130 from the scanner holder 160. Further, the coefficient of friction and the dimension R of the rubber tubes 164 are set to such values that the hand scanner 130 does not come out of the scanner holder 160 by vibration at the time when the shopping cart 10 travels.

Using the shopping cart 10 configured as described above, the shopper performs shopping as follows. Specifically, the shopping cart 10 is initially placed at the entrance or the like of a store. At this time, the hand scanner 130 is held by the scanner holder 160 of the shopping cart 10 so that the handle 132 is directed below. The placement part 131c of the head 131 of the hand scanner 130 is placed on the supporting part 161c of the scanner holder 160. The pair of contact parts 131d of the head 131 on both sides are respectively in contact with the pair of rubber tubes 164 of the head regulators 162.

The shopper withdraws the shopping cart 10 in the stacking state in FIG. 7 to be used. Further, the shopper takes a shopping basket placed in the store, and places the shopping basket on at least one of the reception part 33 or the basket reception part 50 of the caster part 30. Then, while pushing the handle bar 42 of the shopping cart 10, the shopper moves the shopping cart 10 toward a product shelf where products of the store are displayed.

The shopper takes a target product from the product shelf. Further, the shopper takes the hand scanner 130 from the scanner holder 160. The shopper brings the product code of the taken-out product close to the head 131 of the hand scanner 130, and presses the scanner trigger 133. As a result, the product code is read by the hand scanner 130. The information regarding the read product code is transmitted to the controller 154. The controller 154 displays the product name, the price, and the like on the display panel 152 on the basis of the information regarding the product code. The shopper places the product whose product code has been read by using the hand scanner 130 in the shopping basket placed on any one of the reception part 33 or the basket reception part 50 of the caster part 30.

In this way, after reading (scanning) the product code of the product by using the hand scanner 130, while holding the handle 132, the shopper inserts the hand scanner 130 between the pair of arms 163 (head regulators 162) of the scanner holder 160 from above (upward in the vertical direction) so that the head 131 is directed upward (upward in the vertical direction). In the handle 132, the maximum width H in the width direction is narrower than the dimension Q of the distance between the rubber tubes 164 of the head regulators 162. Therefore, the shopper is capable of passing the handle 132 of the hand scanner 130 between the pair of rubber tubes 164. Therefore, the shopper is capable of placing the head 131 on the supporting part 161c of the scanner holder 160 while holding the handle 132 of the hand scanner 130. Specifically, there is no need for the shopper to replace the handle 132 of the hand scanner 130 with the head 131. The hand scanner 130 is held by the scanner holder 160 so that the handle 132 is directed below. At this time, the placement part 131c of the head 131 of the hand scanner 130 is placed on the head support 161 (supporting part 161c) of the scanner holder 160. When the head 131 of the hand scanner 130 is placed on the head support 161, the head regulators 162 of the scanner holder 160 are in contact with the contact parts 131d of the head 131 of the hand scanner 130. The shopper pulls the hand scanner 130 upward from the scanner holder 160 and takes it when using the hand scanner 130. Then, after using the hand scanner 130, the shopper is capable of causing the hand scanner 130 to be stably held by the shopping cart 10, only by inserting the hand scanner 130 into the scanner holder 160 from above (upward in the vertical direction). Specifically, in the shopping cart 10, the usability of the hand scanner 130 is excellent.

For example, the shopper moves the shopping cart 10 to move to the next product shelf. At this time, vibration is generated in the up-and-down direction (vertical direction), in the right and left direction (second direction), and the front-rear direction (first direction) in the scanner holder 160. Since the head 131 of the hand scanner 130 is supported by the head support 161 in the up-and-down direction (vertical direction), it does not drop out of the scanner holder 160. Further, since the head 131 of the hand scanner 130 is held in the right and left direction (second direction) and the front-rear direction (first direction) by the head regulators 162, it does not drop out of the scanner holder 160.

When all the shopping is done, the shopper goes to a payment device. Then, the shopper performs an operation for payment of the shopping product on the display panel 152 of the tablet terminal 150. When receiving the operation for payment by the shopper via the display panel 152, the controller 154 transmits a shopping list to the payment device. The shopper uses the payment device to make payment. The shopper who has finished the payment returns the shopping cart 10 to a predetermined position of the store.

In the case where the shopper stacks the shopping cart 10 for return, if he/she strongly pushes the shopping cart 10 into the forward shopping cart 10, an upward (upward in the vertical direction) force from the forward shopping cart 10 is applied to the hand scanner 130. Further, similarly, in the case where a store clerk gathers and stacks the used shopping carts 10, if he/she strongly pushes the shopping cart 10 into the forward shopping cart 10, an upward (upward in the vertical direction) force from the forward shopping cart 10 is applied to the hand scanner 130. The scanner holder 160 reduces the force of the hand scanner 130 to jump out by the frictional force by the rubber tube 164, which makes it possible to prevent the hand scanner 130 from falling off.

As described above, according to this embodiment, even in the case where the hand scanner 130 receives vibration when the shopping cart 10 travels or impact when stacking the shopping cart 10, the hand scanner 130 does not easily come out of the scanner holder 160. Therefore, it is possible to prevent the hand scanner 130 from being damages in advance, the shopper is capable of easily attach and detach the hand scanner 130, and the usability of the hand scanner 130 is improved.

Further, the head regulators 162 of the scanner holder 160 each include the regulation arm 163c formed to be directed below in the vertical direction. Therefore, even in the case where an upward force in the vertical direction is applied to the head 131 of the hand scanner 130, the hand scanner 130 does not easily fall off. Further, the head regulators 162 each include the regulation arm 163c formed to be directed below in the vertical direction. Therefore, the head regulators 162 do not easily fall off even in the case where an upward (upward in the vertical direction) is applied to the head 131. Further, since the rubber tubes 164 are attached to the regulation arms 163c, friction occurs between the rubber tubes 164 with the contact parts 131d of the head 131. Therefore, even in the case where an upward (upward in the vertical direction) force is applied to the head 131, the hand scanner 130 does not easily fall off and vibration applied to the head 131 is absorbed.

The stopper 146 of the tablet case 140 is in contact with the front surface side (on the one side of the first direction) of the handle 132 of the hand scanner 130 while the head 131 is held in the space of the head regulators 162 (see, for example, FIG. 5). The stopper 146 is in contact with the front surface side of the handle 132 to regulate the forward (one side of the first direction) movement of the handle 132. Therefore, the position of the handle 132 is stabilized. Further, in an embodiment, the stopper 146 is formed of a member different from that of the lower end edge of the case body 141 of the tablet case 140. Meanwhile, by using the stopper 146 as the lower end edge of the tablet case 140, the structure can be simplified without the need for additional members.

Further, the tablet case 140 can be attached or moved to another shopping cart that does not include the electrical device 100. Also in this case, by the scanner holder 160 provided on the tablet case 140, it is possible to prevent the hand scanner 130 from falling off.

In the above-mentioned embodiment, in the tablet case 140, the position of the attachment part 145 of the scanner holder 160 is on the left side of the display panel 152, but may be on the right side of the display panel 152. Further, the scanner holder 160 may be attached at a position different from the tablet case 140. Further, instead of providing the rubber tubes 164 of the head regulators 162, anti-slip processing may be performed on the surface of the regulation arm 163c.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile body that acquires product information given to a product to be purchased and transports the product to be purchased, the mobile body comprising:
   a cart body that is moved to transport the product;
   an acquisition device that acquires the product information; and
   a holder that detachably holds the acquisition device,
   the acquisition device including
      a head that includes an information acquisition unit provided on one side of a first direction, the information acquisition unit to be directed to the product to acquire the product information, the head having a first predetermined width in a second direction orthogonal to the first direction, the first predetermined width on a different side of the first direction being narrower than the first predetermined width on the one side, and
      a handle provided on a lower part on the different side of the head, the handle having a second predetermined width in the second direction, the second predetermined width being narrower than the first predetermined width on the different side of the head,
   the holder being attached to the cart body, the holder including
      a pair of head regulators provided to have a space that is narrower than a maximum width of the first predetermined width of the head and wider than a maximum width of the second predetermined width of the handle, the pair of head regulators being adapted to be in contact with a side surface on the different side of the head held in the space,
      a head support that is adapted to be in contact with a lower surface of the head held in the space of the pair of head regulators, and
      a stopper that is adapted to be in contact with the handle while the head is held in the space of the pair of head regulators.

2. The mobile body according to claim 1, wherein
the pair of head regulators are adapted to be in contact with the side surface on the different side of the head to regulate movement of the head to the different side of the first direction, and
the stopper is adapted to be in contact with the handle to regulate movement of the handle to the one side of the first direction.

3. The mobile body according to claim 2, wherein
the pair of head regulators each include a regulation arm formed to downward in a vertical direction.

4. The mobile body according to claim 3, wherein
the pair of head regulators each include a member that is attached to the regulation arm and adapted to apply a frictional force to the head.

5. The mobile body according to claim 4, wherein
the member that applies the frictional force is adapted to be in contact with the side surface on the different side of the head held in the space of the pair of head regulators.

6. The mobile body according to claim 5, wherein
the member that applies the frictional force is a rubber tube attached to the regulation arm and has a predetermined length in the vertical direction.

7. The mobile body according to claim 2, wherein
the stopper is adapted to be in contact with a surface on the one side of the first direction of the handle.

8. The mobile body according to claim 7, further comprising a terminal case that is attached to the cart body and adapted to house an information processing terminal, the information processing terminal being configured to display information based on the product information from the acquisition device, wherein the stopper is a part of the terminal case.

9. The mobile body according to claim 8, wherein the holder is attached to the terminal case.

10. A terminal case to be attached to a mobile body that acquires product information given to a product to be purchased and transports the product to be purchased, the terminal case comprising:

a casing capable of housing an information processing terminal configured to display information based on the product information from an acquisition device that acquires the product information; and a holder that detachably holds the acquisition device, the acquisition device including a head that includes an information acquisition unit provided on one side of a first direction, the information acquisition unit to be directed to the product to acquire the product information, the head having a first predetermined width in a second direction orthogonal to the first direction, the first predetermined width on a different side of the first direction being narrower than the first predetermined width on the one side, and a handle provided on a lower part on the different side of the head, the handle having a second predetermined width in the second direction, the second predetermined width being narrower than the first predetermined width on the different side of the head, the holder being attached to the casing, the holder including a pair of head regulators provided to have a space that is narrower than a maximum width of the first predetermined width of the head and wider than a maximum width of the second predetermined width of the handle, the pair of head regulators being adapted to be in contact with a side surface on the different side of the head held in the space, a head support that is adapted to be in contact with a lower surface of the head held in the space of the pair of head regulators, and a stopper that is adapted to be in contact with the handle while the head is held in the space of the pair of head regulators.

* * * * *

UNITED STATES PATENT AND TRADEMARK OFFICE
CERTIFICATE OF CORRECTION

PATENT NO. : 11,167,780 B2
APPLICATION NO. : 16/441409
DATED : November 9, 2021
INVENTOR(S) : Yukiko Yokoyama It is certified that error appears in the above-identified patent and that said Letters Patent is hereby corrected as shown below:

On the Title Page

Delete title page and substitute therefore with the attached title page consisting of the corrected illustrative figure(s).

In the Drawings

Sheet 2, Fig. 2, should be replaced with the Replacement Sheet Fig. 2 as shown on the attached page.

Signed and Sealed this
Ninth Day of April, 2024

Katherine Kelly Vidal
*Director of the United States Patent and Trademark Office*

(12) United States Patent
Yokoyama

(10) Patent No.: US 11,167,780 B2
(45) Date of Patent: Nov. 9, 2021

(54) MOBILE BODY AND TERMINAL CASE TO BE ATTACHED TO THE SAME

(71) Applicant: TOSHIBA TEC KABUSHIKI KAISHA, Tokyo (JP)

(72) Inventor: Yukiko Yokoyama, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 285 days.

(21) Appl. No.: 16/441,409

(22) Filed: Jun. 14, 2019

(65) Prior Publication Data

US 2020/0139997 A1  May 7, 2020

(30) Foreign Application Priority Data

Nov. 1, 2018  (JP) ............................. JP2018-206869

(51) Int. Cl.
*B62B 3/14* (2006.01)
*B62B 5/00* (2006.01)
*G06F 1/16* (2006.01)
*G06K 7/10* (2006.01)

(52) U.S. Cl.
CPC .............. *B62B 3/1424* (2013.01); *B62B 3/14* (2013.01); *B62B 3/1412* (2013.01); *B62B 3/1428* (2013.01); *B62B 5/0096* (2013.01); *G06F 1/1626* (2013.01); *G06K 7/10* (2013.01); *G06K 2007/10524* (2013.01)

(58) Field of Classification Search
CPC ....... B62B 3/1424; B62B 3/14; B62B 3/1412; B62B 3/1428; B62B 5/0096; G06F 1/1626; G06K 7/10; G06K 2007/10524; G06K 7/10881; G07G 1/0081; G07F 7/0618; G06Q 20/3276
See application file for complete search history.

(56) References Cited

U.S. PATENT DOCUMENTS

| | | | | |
|---|---|---|---|---|
| 4,071,740 | A | * | 1/1978 | Gogulski ................ G07G 1/06 235/431 |
| 4,766,297 | A | * | 8/1988 | McMillan .......... G06K 7/10861 235/455 |
| 5,105,070 | A | * | 4/1992 | Wike, Jr. ............ G06K 7/10871 235/462.45 |

(Continued)

FOREIGN PATENT DOCUMENTS

| | | | | |
|---|---|---|---|---|
| CN | 110999015 A | * | 4/2020 | ............. H02J 50/10 |
| EP | 0490605 A1 | * | 6/1992 | ......... G06K 7/10881 |

(Continued)

OTHER PUBLICATIONS

Extended European Search Report dated Jan. 15, 2020, filed in counterpart European Patent Application No. 19192243.4, 9 pages.

(Continued)

*Primary Examiner* — Jacob B Meyer
(74) *Attorney, Agent, or Firm* — Kim & Stewart LLP

(57) ABSTRACT

According to an embodiment, a mobile body acquires product information given to a product to be purchased and transports the product to be purchased. The mobile body includes a cart body, an acquisition device, and a holder. The cart body is moved to transport the product. The acquisition device acquires the product information. The holder detachably holds the acquisition device.

10 Claims, 7 Drawing Sheets